Jan. 16, 1968  E. R. NELSON  3,363,790
VEHICLE MOUNTED CONTAINER HANDLING EQUIPMENT
Filed Sept. 29, 1965  5 Sheets-Sheet 3

INVENTOR.
Eugene R. Nelson
BY
*B. B. Olin*
ATTORNEY

FIG. 11

3,363,790
VEHICLE MOUNTED CONTAINER HANDLING EQUIPMENT

Eugene R. Nelson, Durham, N.C., assignor to Miller Manufacturing Company, Inc., Durham, N.C., a corporation of North Carolina
Filed Sept. 29, 1965, Ser. No. 491,294
18 Claims. (Cl. 214—518)

ABSTRACT OF THE DISCLOSURE

A truck body is provided with an elevator-conveyor system which includes a vertical track mounted onto the back of the truck body, a horizontal track mounted on and extending the length of the truck body top, a connecting track adapted to move on the vertical track and to connect the horizontal and vertical tracks, a platform received by the connecting track for vertical movement and adapted to ride from the connecting track to and along the horizontal track when the connecting track is in alignment with the horizontal track and power means controlled by separate control stations located on the truck body and on the platform for moving the platform vertically and horizontally.

---

This invention relates to container handling equipment for vehicles and, more specifically, to a vehicle having in combination therewith a platform which is movable both in the vertical and horizontal directions for supporting containers.

Business efficiency requires that a minimum of time and effort be consumed in emptying individual containers. For this reason, many trucks are provided with self-loading mechanisms which engage the containers and dump the contents thereof into the truck body. A refuse collecting truck of this type is generally limited in scope for all of the refuse is dumped into a single receptacle which is not practical in that waste products and trash in general are classified as wet and dry. It is economically desirable to burn the wet and dry refuse separately for they require vastly different quantities of fuel to consume the same. Furthermore, some waste products have further utility while others do not and without a means to separate the two, the usable waste products are lost. For example, this invention is especially adapted for use in an animal or poultry rendering plant for the waste products from the same are of a diverse nature and are used for many different purposes.

A system for emptying the containers involves the use of a vehicle which can travel from location to location where the containers are kept and which is equipped with a mechanism for conveying the containers to a point where their contents can be dumped into a suitable receptacle on the vehicle. After the various receptacles on the vehicle are full, it is driven to a dumping station where the contents thereof are emptied into separate vats. Such a system eliminates the need for hauling individual containers to a dumping location as required in the past and then returning the same to their former site. Therefore, the number of trips which the vehicle must make to the dumping location is greatly reduced thereby allowing the vehicle to service a greater number of containers within a given time period. This system does not require the removal of containers from the premises, and the containers are immediately ready to be refilled.

One type of vehicle-mounted mechanism employed in this system for handling containers is commonly called a rear end loader. Some rear end loaders employ a pair of lifting arms, others use a pair of parallel tracks, and others use a pulley arrangement and all achieve the same result in lifting a refuse container to an elevated position for dumping the refuse therein into the truck receptacle. Although these types of rear end loading devices have proved satisfactory in the past, it has been discovered that certain advantages can be gained by providing the truck body with means to convey a refuse container horizontally as well as vertically while maintaining the container in its original upright position. For example, in handling waste from a rendering plant, it is necessary to direct different kinds of waste into different truck receptacles so as to keep them separate for faster processing. Therefore, an object of this invention is to provide for a container handling vehicle a movable container supporting platform which is adapted to move upwardly along a vertically spaced track and then be transferred to a separate and independent horizontally spaced track.

Another object of this invention is to provide such a vehicle with a movable platform having a control station on the platform and which is adapted to being controlled by an operator standing on the platform.

A further object of this invention is to provide such a vehicle with a multi-purpose platform which is operable both as a container conveying platform and as a tail gate section.

Yet another object of this invention is to provide a container handling vehicle with a vertically and horizontally movable platform which includes safety means that define the boundaries of movement in each given plane.

Still another object of this invention is to provide a vehicle with a vertically and horizontally movable platform that is made operable by electrical means in combination with a central hydraulic system.

Yet, a further object of this invention is to provide a rear end loader which is capable of handling large and heavy containers by use of a relatively simple and inexpensively mounted structure.

Other objects and advantages of this invention will become apparent when the following detailed description is read in conjunction with the appended drawings, specification and claims. Preferred embodiments of this invention will now be described with reference to the accompanying drawings, in which:

One embodiment of this invention provides a vehicle with a vertically mounted track located at the rear end thereof and a horizontally mounted track which communicates with the vertically mounted track and which extends from the rearmost part of the vehicle across the top thereof to the front part of the vehicle. Each track includes two fixed rails which are spaced apart substantially the width of the vehicle. A movable, normally horizontal, platform is provided for receiving containers loaded with refuse at ground level. Guided by the vertical track, the platform is arranged to be moved upwardly to the elevation of the horizontal track whereupon the platform may be disengaged from the vertical track and permitted to roll the length of the horizontal track such that the containers may be dumped into selected sections of the vehicle body.

The vertical track includes a pair of oppositely disposed outer rails. The outer rails are rigidly mounted to the rear portions of the vehicle and are shaped as inwardly facing channels. Each of these channels serves as a guide for a respective movable member termed a "pinion rail," each pinion rail having rollers which mount and roll within a respective outer rail channel of the vertical track. The pinion rail is a flat, elongated, rigid member which includes rollers mounted on each opposed and flat surface side thereof. The rollers on the outwardly facing side of each pinion rail are received by the respective channel of a vertical track outer rail. The rollers on the inwardly facing side of each pinion rail receive and roll within an "inner track" which inner track is comprised of two opposed vertically movable inner channel rails which are similar in design to but substantially shorter than and oppositely turned from the vertical track outer rails. A third pair of channel rails, termed the "platform receiving rails," are pivotally hinged to the inside faces of inner channel rails. The channels of the platform receiving rails face inwardly and receive rollers which support the platform. The platform receiving rails are horizontally disposed when the platform is to receive and transfer containers and the like and are moved into a vertical position in alignment with the previously mentioned vertical track outer rails when the platform is to be used as a tail gate.

The platform structure incorporates an associated tail gate member which is pivotally mounted underneath the platform proper and which may be pivoted into a vertical position to form a tail gate when the platform itself is vertically positioned above its tail gate member. A spring loaded latch is mounted on each platform receiving rail and rests against a shoulder mounted to the side of the platform to prevent the platform from rolling while the same is being moved in a vertical plane.

To raise and lower the platform, the vehicle is provided with a pair of horizontally disposed hydraulic cylinders which are mounted on the top of each laterally extending side wall. The exposed end of the piston rod of each hydraulic cylinder is secured to a horizontally movable structure having a rotatably mounted sprocket. A second pair of sprockets are mounted on axis which are fixedly positioned on the extreme end portions of the side panels and are in alignment wtih the piston rod sprockets. A flexible chain is provided for each hydraulic cylinder and each such chain has one end rigidly attached to a side panel at a selected point toward the rear portion thereof. The chain then runs forward therefrom toward the front of the vehicle and engages the piston rod sprocket. The chain then runs backwardly over itself and engages the respective sprocket mounted at the rear of the vehicle and then runs downwardly in alignment with a respective channel rail comprising the "inner track" and is attached thereto. The hydraulic cylinders operate conventionally. When the piston rods are extended their full lengths, the platform receiving rails which are pivotally mounted on a respective rail of the "inner track" occupy their lowest vertical position and the platform rests on the ground. However, when the piston rods are pulled inwardly the ends of the chains which are attached to the channel rails comprising the "inner track" are pulled upwardly and the platform is raised. When the pistons of the hydraulic cylinders reach their inwardmost position, the movable platform will have been raised into a position whereby it may roll from the platform receiving rails of the vertical track onto the horizontal track. Also, as the cylinder pistons reach such inwardmost position, a circuit breaker switch is caused to be closed thereby completing a circuit which allows the platform receiving rails of the vertical track to be locked in an upwardly extended position. The spring loaded latches which prevent horizontal movement of the platform on the platform receiving rails while the platform is being moved vertically are pivoted into a position which permits the platform to be moved in a horizontal direction on the platform receiving rails such that it can be transferred to the horizontal track.

When the platform has reached its vertical limit of travel, a pair of so-called hydraulic locking cylinders are actuated to hold the platform receiving rails in position. A hydraulic locking cylinder is mounted at the rear portion of each side panel and upon energization, the piston rod thereof extends through a portion of its respective side panel and into the adjacent respective channel rails comprising the "inner track" of the vertical track. When the hydraulic locking cylinders are actuated, the electrical circuit controlling the up and down or vertical motion of the platform is opened while the electrical circuit controlling the horizontal movement of the platform is closed thereby adapting the same to be moved inwardly along the horizontal track.

Horizontal motion is provided to the platform by means of a hydraulic motor which is mounted on the outside of the receptacle portion of the vehicle and on a front wall which is perpendicular to the side walls thereof. The hydraulic motor is connected by a wheel and belt arrangement to a laterally extending shaft which is mounted on the top portions of the side walls adjacent the front wall. This shaft is provided with a first pair of sprockets which are in alignment with the respective side wall panels and cooperate therewith. In alignment with the mentioned first pair of sprockets is a second pair of sprockets each of which is mounted on a respective rear end of a side panel. A flexible chain is provided for each set of cooperating sprockets and the ends of the chain are connected to a traveler thereby providing an endless track although in actual practice the traveler does not come in contact with either sprocket. Each traveler is provided with a finger that engages an eyelet in the platform when the platform is in its top vertical position and is ready to be moved horizontally. When the hydraulic motor is energized, the travelers pull the platform from the platform receiving rails onto the horizontally disposed track which comprises a pair of inwardly facing and oppositely disposed channel shaped rails. These rails are similar in design to the platform receiving rails of the vertical track and when the platform receiving rails of the vertical track are in an upwardly extending position and are in alignment with the horizontal track rails, the horizontal track rails in actuality form a continuation or extension thereof. When the hydraulic motor is energized, the travelers pull the platform from the platform receiving rails of the vertical track forward along the horizontal track and over the body of the track.

The platform may be stopped at any place enroute toward the forward part of the vehicle until it reaches its limit of forward horizontal travel whereupon a switch which is activated by the traveler first opens the electrical circuit controlling horizontal movement and closes the electrical circuit controlling the hydraulic looking cylinders. At this position the platform receiving rails of the vertical track may be lowered without disturbing the platform. However, it is to be noted that this is the only position at which the platform may remain on the horizontal track while the platform receiving rails are lowered. This advantage allows the operator of the vehicle to move the same without having the inner track members of the vertical track extending above the top position of the vehicle. To move the platform towards the rear of the vehicle from such a forward position, the hydraulic cylinders must be reenergized and must lock the vertical track in its upwardly extending position whereupon the appropriate electrical circuit is then closed for the platform to be moved horizontally and rearwardly.

The hydraulic system is comprised of a standard hydraulic pump which may be purchased, for example, from the Commercial Shearing Company of Youngstown 1, Ohio. The feed line extending from the pump is connected to a bank of four way solenoid valves, with a four way solenoid valve being provided for each movement, namely, the horizontal movement, the vertical movement, and the hydraulic locking means. A bank of solenoid valves of this type may be purchased from the Waterman Hydraulics Corporation, Evanston, Ill. Each four way solenoid valve controls a respective motion whether it be the vertical movement of the platform which is provided by the first mentioned pair of hydraulic cylinders, the horizontal movement of the platform which is provided by the mentioned hydraulic motor, or the platform receiving rails locking and unlocking action which is provided by the other mentioned hydraulic cylinders. As is the usual procedure, this hydraulic system is provided with a by-pass line having therein a relief valve of a common type.

It is to be noted that there is an independent electrical circuit provided for each movement of the platform including up, down, in and out, also for the movements of the lock and unlock positions of the hydraulic locking cylinders. The safety and limit switches employed herein are of the general lever arm operated type. A push button electrical control station of almost any type may be used; however, it is to be noted that a button is provided for each of the four movements of the platform and each of the two movements of the hydraulic locking cylinders. A push button station is mounted on the rear outer portion of the body of the truck and also on the platform so that an operator may move the platform either while standing thereon or while being on the ground. The power is supplied to the electrical system from the battery mounted in the motor housing of the vehicle which is generally of the 12 volt type. The hydraulic pump is driven by a power take off mounted on the side the vehicle's transmission; this is of a standard type.

The invention is illustrated in connection with the accompanying drawings in which the figures are illustrative of the preferred embodiment of the invention.

The rear end loader vehicle of the invention is designated by reference numeral 10 and is comprised mainly of a cab portion 11 and a receptacle portion 12. The receptacle portion 12 includes a front panel 13, a right side panel 14, a left side panel 15 and a floor 16. Receptacle 12 is compartmented by partitions 17 and 18 which are removable or which can be arranged for pivoted or vertical movement to facilitate unloading. Located at the rear of each side portion 15 and 14 are posts 20 and 19. Posts and 20 provide support for and have mounted thereon vertical track 30.

Figure 1:
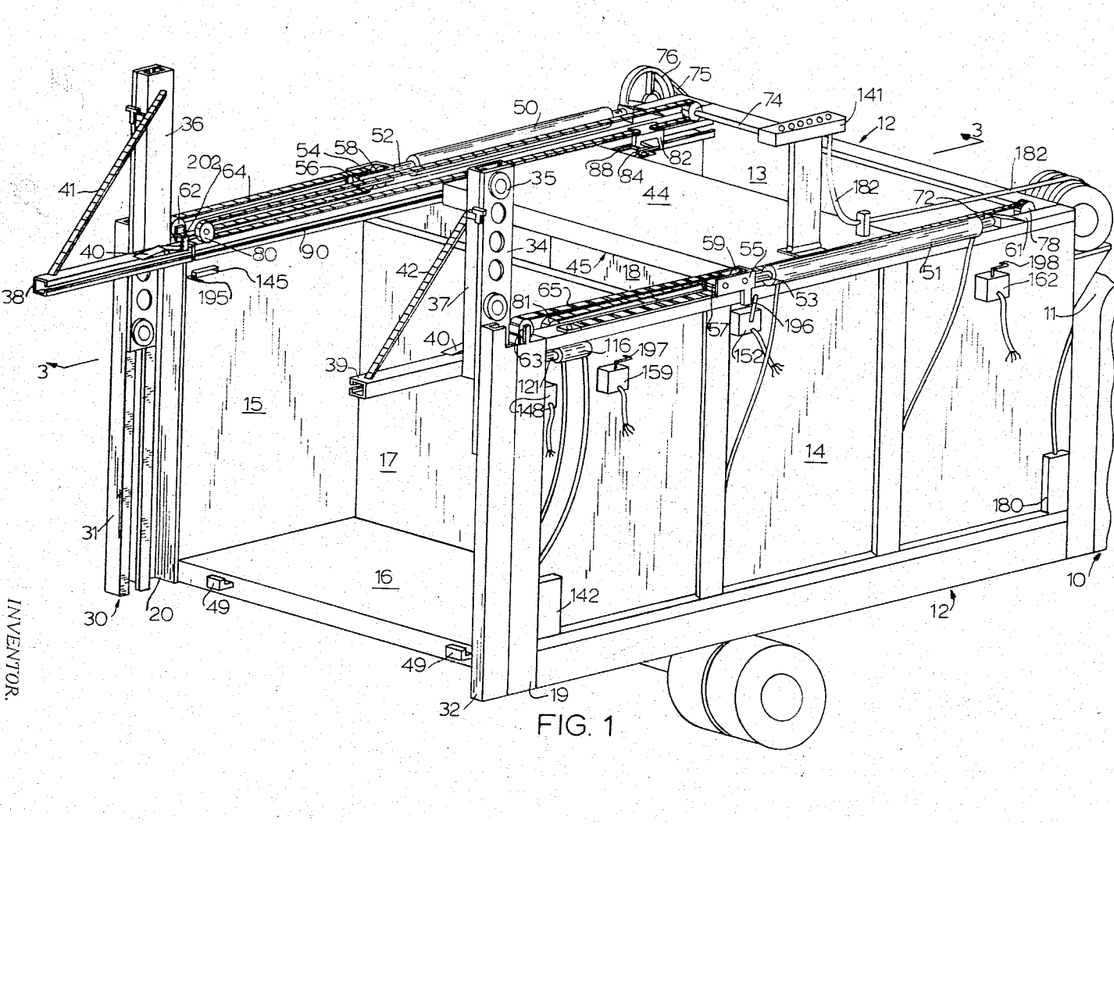
FIGURE 1 is a perspective view of the vehicle showing the hydraulic systems which impart to the platform a vertical and a horizontal motion.
Figures 2, 4, 5:
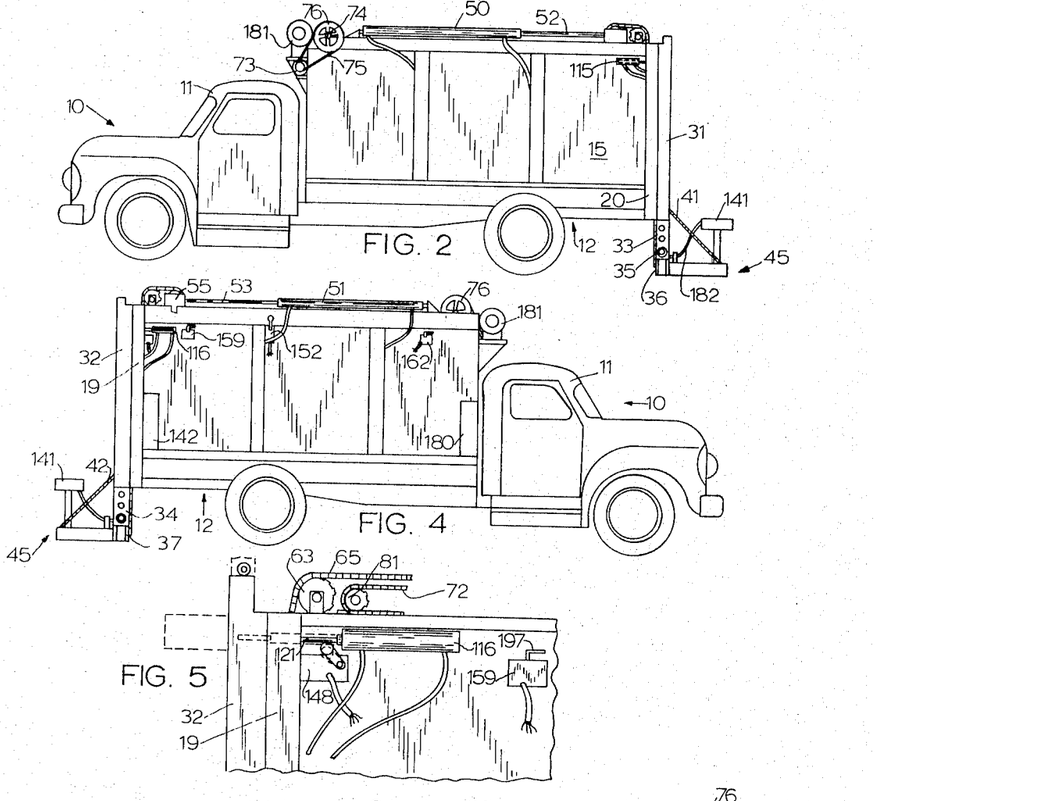
FIGURE 2 is a left side elevation view of the vehicle showing the loading platform in a ground engaging position.
FIGURE 4 is a right side elevation view of the vehicle showing the loading platform in a ground engaging position.
FIGURE 5 is a fragmentary view of the truck body showing the movements of a hydraulic locking cylinder.
Figure 3:
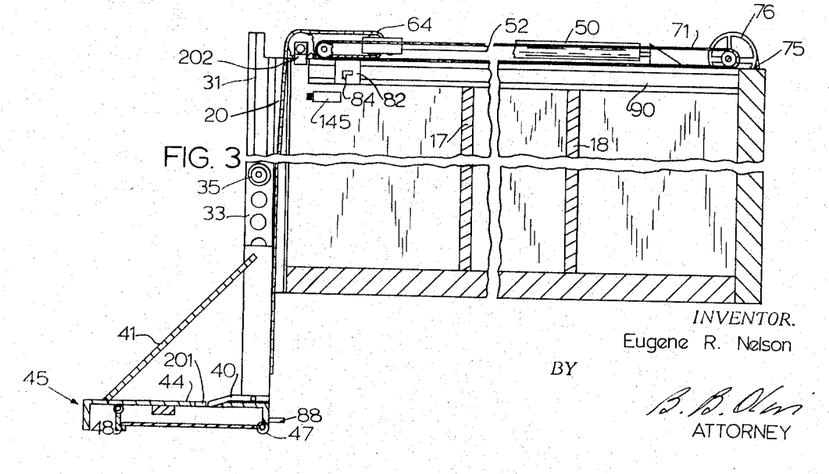
FIGURE 3 is a sectional view taken along lines 3—3 of FIGURE 1 showing portions of the vertically and horizontally mounted track and the platform located in a ground engaging position.
Figures 6, 7:
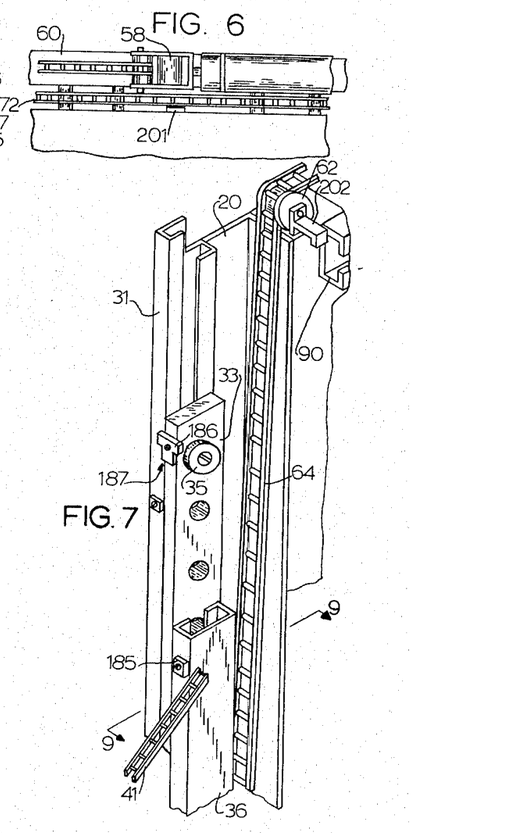
FIGURE 6 is a fragmentary view of the platform positioned adjacent a horizontally mounted hydraulic cylinder.
FIGURE 7 is a perspective view of a portion of the vertical track showing the working relationship of the rails comprising the same.
Figure 9:
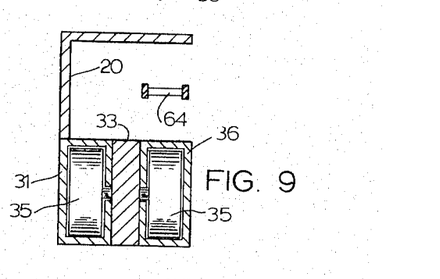
FIGURE 9 is a sectional view taken along lines 9—9 of FIGURE 7 showing the wheels of the pinion rail being received by the two disposed channel rails.
Figure 10:
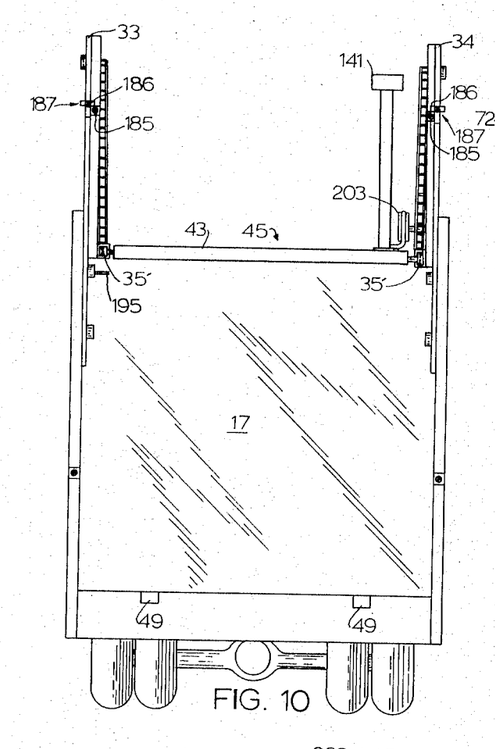
FIGURE 10 is an end elevation view of the vehicle showing the platform having been moved into its highest vertical position.

Vertical track 30 includes a pair of channel rails 31 and 32 which are inwardly facing and are securely mounted on posts 20 and 19 respectively. Channel rails 31 and 32 respectively receive pinion rails 33 and 34 which have rollers 35 secured to both sides thereof. Rollers 35 placed on the outwardly facing surfaces of pinion rails 33 and 34 are slidably received by channel rails 31 and 32. Vertical track 30 is completed by having a pair of outwardly facing and inwardly disposed rails 36 and 37 which are respectively slidably mounted on rollers 35 of pinion rails 33 and 34. A pair of platform receiving channel rails 38 and 39 have respectively hinged thereto a pair of latches 40. To support platform rails 38 and 39 in a horizontal direction, chains 41 and 42 respectively connect the upper portion of inwardly positioned channel rails 36 and 37 to the outwardly extending portions of platform rails 38 and 39.

Platform 45 which is comprised of a top surface 44 and sides 43 is provided with rollers 35' which are adapted to engage any channel member and are selectively mounted on sides 43. Platform 45 serves both to receive receptacles or containers when in a horizontal position and as a tail gate when pivoted into a vertical position. To complete the tail gate structure, platform 45 has pivotally mounted on a selected side 43 by hinges 47 a tail gate section 46 which extends parallel with top surface 44 and below the same. When platform 45 is to be raised or lowered, it is received by platform receiving rails 38 and 39 and is held therein by spring loaded latches 40 which are pivotally mounted on platform receiving rails 38 and 39 and which rest against shoulder 201 of platform 45. When platform 45 is at its highest vertical position, triggers 202 press downwardly on the back end of latches 40 thereby lifting the front end out of contact with shoulders 201 and allowing platform 45 to roll inwardly on rails 38 and 39. When platform 45 is used as a container receiver, tail gate section 46 is parallel thereto and held in that position by a pivotally mounted spring loaded lever arm 48. The end of floor 16 of vehicle 10 has mounted thereon two brackets 49 which are adapted to wedge and securely receive tail gate section 46 when tail gate section 46 and platform 45 are operable to be used as a tail gate.

A pair of hydraulic cylinders 50 and 51 are respectively mounted on the top of side partitions 15 and 14. Piston rods 52 and 53 which are integral working parts of hydraulic cylinders 50 and 51 are each provided with U-shaped brackets 54 and 55 which receive sprockets 56 and 57 respectively and rollers 58 and 59. Rollers 58 and 59 travel on tracks 60 and 61, respectively. Rollers 58 and 59 vertically stabilize brackets 54 and 55 as well as piston rods 52 and 53. Side partitions 15 and 14 each have respectively mounted thereon sprockets 62 and 63 which are located at the upper back extremity of each side panel. Chains 64 and 65 provide vertical movement for platform 45. The ends of each of chains 64 and 65 are respectively secured to inwardly positioned channel members 36 and 37 and are trained to extend upwardly and over rotatably mounted sprockets 62 and 63, horizontally along and above the upper surface of side partitions 51 and 14, around sprockets 56 and 57 and back toward sprockets 62 and 63 where the opposite end of each chain is fastened to side panels 15 and 14. By moving piston rods 52 and 53 inwardly into hydraulic cylinders 50 and 51, platform 45 is thereby raised until brackets 54 and 55 impinge against the surfaces of hydraulic cylinders 50 and 51, respectively.

Platform 45 is propelled along the horizontal track 70 by means of endless chains 71 and 72 which are indirectly connected to a hydraulic motor 73 by a shaft 74, a wheel 76 and a belt 75. Shaft 74 is mounted in side walls 15 and 14 and adjacent front wall 13 at the upper extremity thereof. Shaft 74 receives a wheel 76 which is mounted externally of side wall 15 and which receives belt 75 thereby imparting a rotative motion to shaft 74. Shaft 74 is also provided with sprockets 77 and 78 which are mounted respectively adjacent side walls 15 and 14 and which respectively receive chains 71 and 72. Chains 71 and 72 extend rearwardly and around sprockets 80 and 81 which are mounted at the upper extremity of side walls 15 and 14, respectively. Chains 70 and 71 form an endless loop by being connected to traveler plates 82 and 83, respectively. Plates 82 and 83 are provided with downwardly extending fingers 84 and 85 (traveler plate 83 and finger 85 are not shown).

Horizontal track 70 is comprised of a pair of inwardly facing and oppositely disposed channel rails 90 and 91 which are mounted on the inside of and near the upper extremities of side walls 15 and 14. When platform 45 is at its highest position on vertical track 30, horizontal rails 90 and 91 are in alignment with and form an extension of platform receiving rails 38 and 39 whereby when latches 40 which hold platform 45 in rails 38 and 39 are released and fingers 84 and 85 are received by slots 88 and 89 which are mounted on either side of p'atform 45 and in communication with fingers 84 and 85, respectively. Platform 45 is rollably drawn along channels 90 and 91 by fingers 84 and 85, respectively, which are in turn connected to chains 71 and 72.

Figure 11:
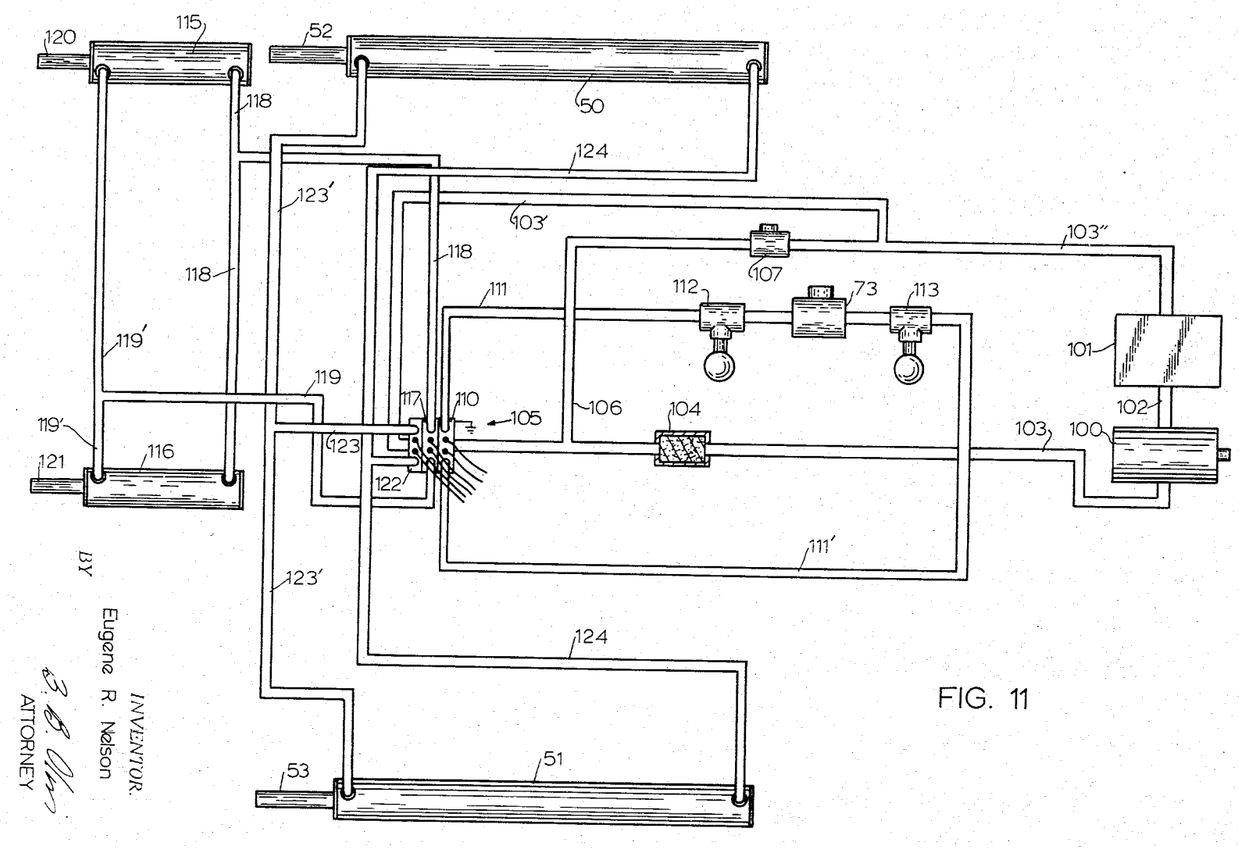
FIGURE 11 is a schematic view of the hydraulic circuit used for energizing the locking means and to power the movable platform in both the vertical and horizontal directions.

Referring now to FIGURE 11, motion is imparted to platform 45 by means of a closed electrically and remotely actuated hydraulic system. Power is imparted to the hydraulic system by a hydraulic pump 100 which receives the hydraulic fluid from a reservoir 101 through line 102. The pressurized fluid passes out of hydraulic pump 100 through line 103, through a conventional filter 104 to a bank 105 of four way solenoid valves. Solenoid valve bank 105 is comprised of three individual four way valves, 110, 117 and 122, which meter the pressurized hydraulic fluid to the various components of the hydraulic systems. All valves are normally closed and are electrically opened. A pressurized hydraulic fluid circulates through line 103', line 103" and back to reservoir 101. To provide for any sudden increase in hydraulic pressure, the system is provided with a by-pass line 106 which short circuits solenoid valpe bank 105. Therefore, the pressure is regulated in the system by means of by-pass palve 107 which is in by-pass line 106.

To energize hydraulic motor 73 and thereby pull platform 45 along horizontal track 70 inwardly, solenoid 166 of four way solenoid valve 110 of the valve bank 105 is energized which opens valve 110 thereby permitting the pressurized hydraulic fluid to selectively enter line 111 which passes through accumulator 112, through motor 73, through accumulator 113, back along line 111' to the opposite side of four way solenoid valve 110 whereupon the pressurized fluid reenters line 103'. If the platform were to be moved in the reverse direction, solenoid 179 opposite the one previouly energized of four way solenoid valve 110 would be energized whereupon the pressurized fluid would flow in the reverse direction to that just previously described.

In order to maintain platform receiving rails 38 and 39 adjacent horizontally disposed rails 90 and 91 while platform 45 is rollably received by horizontal rails 90 and 91, a pair of hydraulic locking cylinders 115 and 116 are mounted respectively at the upper and rearward extremities of side panels 15 and 14. When locking cylinders 115 and 116 are energized, piston rods 120 and 121 thereof extend through posts 20 and 19 respectively and into inwardly disposed and vertically mounted rails 36 and 37 thereby locking all elements of vertical track 30 at its highest position. To energize locking cylinders 115 and 116, solenoid 155 of four way solenoid valve 117 is opened thereby permitting pressurized fluid to travel through line 118 and into hydraulic cylinders 115 and 116. The hydraulic fluid displaced from cylinders 115 and 116 is returned to four way solenoid valve 117 through lines 119 and 119'. To unlock or reverse the direction of piston rods 120 and 121, solenoid 183 of four way solenoid valve 117 is energized thereby permitting pressurized hydraulic fluid to enter cylinders 115 and 116 through lines 119' and 119. As previously mentioned, hydraulic fluid cylinders 50 and 51 provide the vertical motion for platform 45. To raise platform 45, solenoid 144 of four way solenoid valve 122 is energized to permit the pressurized hydraulic fluid to flow through lines 123' and 123 and into cylinders 50 and 51. The fluid displaced from cylinders 50 and 51 returns to four way solenoid valve 122 through line 124.

Figure 12:
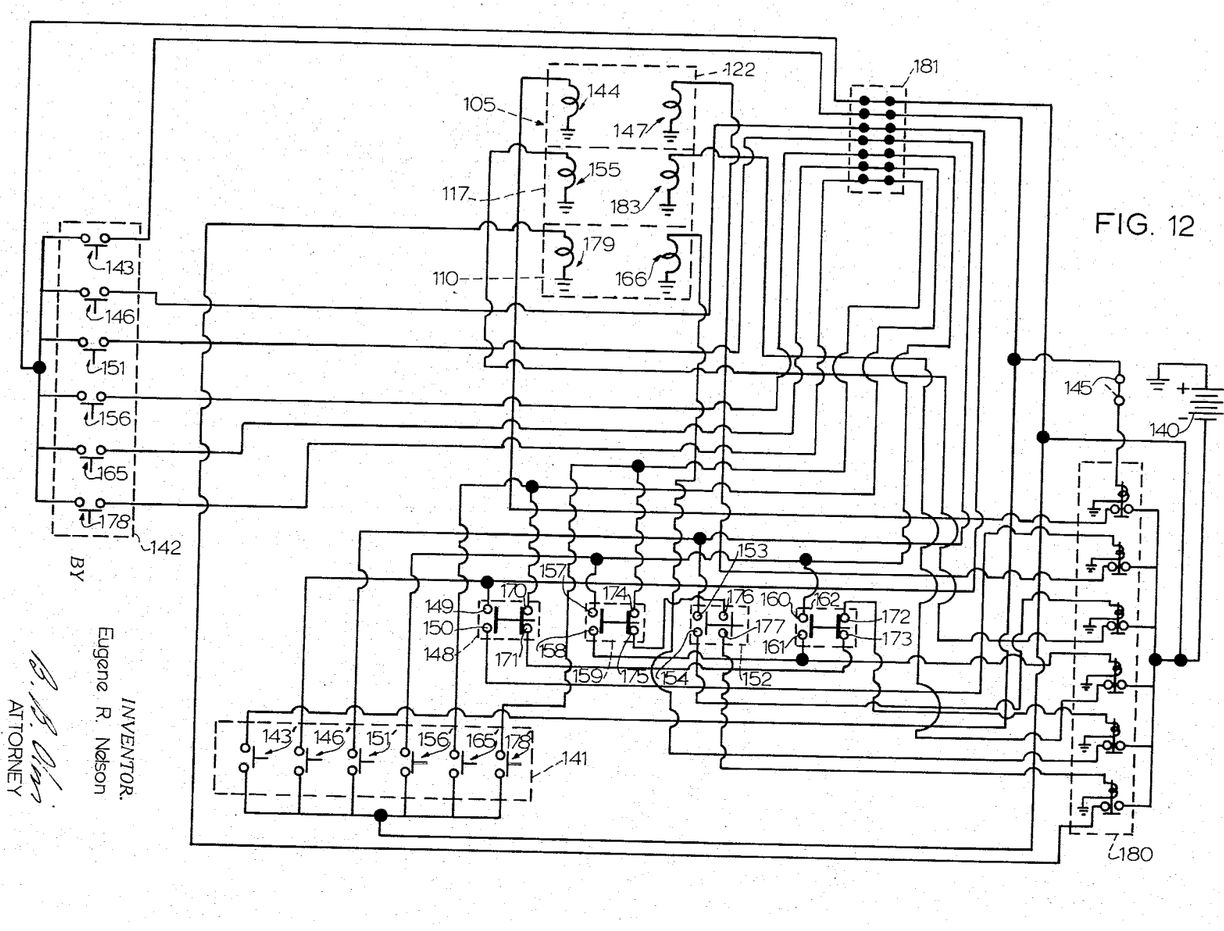
FIGURE 12 is a schematic wiring diagram showing the circuits controlling the horizontal and vertical movements of the platform and the locking cylinders.

Referring to the schematic electrical diagram of FIGURE 12, the voltage for energizing the electrical system is drawn from a regular 12 volt battery 140 which is also used to power the other electrical systems of the vehicle. The vehicle is provided with two control panels 141 and 142 which are respectively mounted on a side of the vehicle and on platform 45. Each control panel is comprised of six switches. Switches 143 and 143', when closed, complete the circuit which energizes solenoid 144 of solenoid valve 122. In order for solenoid 144 to be activated, circuit breaker 145 must be closed; circuit breaker 145 is normally closed and opens only when the platform 45 trips lever arm 195 of circuit breaker 145. Platform 45 is adapted to trip lever arm 195 of circuit breaker 145 when it is pivoted into a vertical plane and is to be used as a tail gate. This limits the upward vertical travel of platform 45 when acting as a tail gate. Circuit breaker 145 limits the upward travel of platform 45 when platform 45 is in a vertical position and serving as a tail gate. Switches 146 and 146', by completing the down circuit, thereby energizes solenoid 147 of four way solenoid valve 122. In order for the down circuit to be complete, double throw switch 148 must be closed across terminals 149 and 150. Double throw switch 148 is arranged to be closed across terminals 149 and 150 when the piston rods 120 and 121 of cylinders 115 and 116 are fully retracted. Switches 151 and 151' of control panels 142 and 141, when closed, complete the circuit which causes the piston rods 120 and 121 of locking cylinders 115 and 116 to extend outwardly and into channel rails 36 and 37, respectively, thereby locking said channel rails in their upwardly extending position. For said locking circuit to be complete, double throw switch 152 must be closed across terminals 153 and 154. Terminals 153 and 154 are in electrical contact when piston rods 52 and 53 of horizontally mounted hydraulic cylinders 50 and 51 have been withdrawn therein to their maximum limit thereby raising platform 45 to its highest vertical position and causing lever arm 196 of double throw switch 152 to be tripped by bracket 55. Switches 151 and 151', when closed, energize solenoid 155 of solenoid valve 117 thereby causing the piston rods 120 and 121 of locking cylinders 115 and 116 to be extended into channels 36 and 37, respectively.

To withdraw piston rods 120 and 121 from channel rails 36 and 37, switch 156 or 156' is closed. However, to complete the unocking circuit either the terminals 157 and 158 of double throw switch 159 or terminals 160 and 161 of double throw switch 162 must be connected and this is done by traveler plate 83 (not shown) tripping lever arm 197 of double throw switch 159 or by tripping lever arm 198 of double throw switch 162. Lever arms 197 and 198 extend through side wall 14 and into the path of travel of traveler plate 83. Switch 159 is actuated and terminals 157 and 158 are connected when platform 45 is rollably received by platform receiving channels 38 and 39 and switch 162 is actuated and terminals 160 and 161 are connected when platform 45 has been laterally moved along channel rails 90 and 91, away from vertical track 30, into a position substantially adjacent front wall 13. It is only at these two extreme positions that solenoid 183 of solenoid valve 117 which controls the unlocking of cylinders 115 and 116 can be energized. To move platform 45 inwardly along channel rails 90 and 91, one of switches 165 and 165' of control panels 142 and 141 is closed. Solenoid 166 of four way solenoid valve 110 is caused to be energized by the closing of switch 165 or 165' when both the terminals 170 and 171 of double throw switch 148 and terminals 172 and 173 of double throw switch 162 are electrically connected. In other words, piston rods 120 and 121 must have been extended and lock the vertical track 30 at its highest position and the platform 45 must not be at its extreme position away from vertical track 30.

To move platform 45 outwardly toward vertical track 30, switch 178 or 178' is closed thereby energizing solenoid 179 of four way solenoid valve 110. In order to complete the circuit to move platform 45 outwardly, terminals 174 and 175 of double throw switch 159 and terminals 176 and 177 of double throw switch 152 must be electrically connected. Switch 159 is actuated and terminals 174 and 175 are connected when platform 45 is in any position along horizontal track 70 and platform receiving rails 38 and 39 except when platform 45 is completely received by platform receiving rails 38 and 39. Switch 152 is actuated and terminals 176 and 177 are connected when piston rods 52 and 53 have been fully retracted into hydraulic cylinders 50 and 51.

The entire circuit is provided with a solenoid switch bank 180 which includes a solenoid switch for each of the previously mentioned switches which are 143, 146, 151, 156, 165 and 178. In order to mount control panel 142 on platform 45, a take-up reel 181 is mounted on front wall 13 and in a position to have connecting cable 182 withdrawn along a line substantially parallel with horizontally disposed rail 91. When platform 45 is being raised and lowered, cable 182 travels over a slotted roller 203 which positions cable 182 away from the working elements of the invention.

Figure 8:
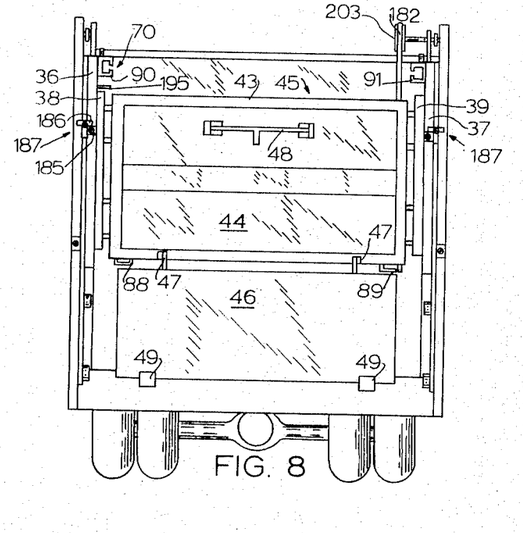
FIGURE 8 is an elevation view of the rear of the vehicle showing the movable platform pivoted into a vertical position with the bottom portion thereof lowered into vertical alignment therewith thereby adapting the same to be used as a tail gate.

In operation, as shown in FIGURE 8, platform 45 is adjacent the ground and in a loading position. To raise platform 45, switch 143 or 143' is closed thereby completing the up circuit and energizing solenoid 144 which opens solenoid valve 122 thereby retracting piston rods 52 and 53 of hydraulic cylinders 50 and 51. As inner channel rails 36 and 37 rise, stops 185 which are mounted thereon contact shoulder 186 of lifting T 187 thereby raising pinion rails 33 and 34 upwardly and resultingly extending vertical track 30. When platform 45 reaches its maximum vertical height and piston rods 52 and 53 of hydraulic cylinders 50 and 51, respectively, have been withdrawn to their innermost positions, terminals 153 and 154 are electrically connected as well as terminals 176 and 177 of double throw switch 152. By connecting terminals 153 and 154, the hydraulic locking cylinder circuit is complete and upon closing switch 151 or 151' solenoid 155 is energized thereby opening solenoid valve 117 which causes piston rods 120 and 121 to be moved into inwardly positioned channels 36 and 37 thereby locking platform receiving rails 38 and 39 in a position of continuance with horizontally disposed channel rails 90 and 91. Latches 40 which are spring loaded and pivotally mounted on platform receiving rails 38 and 39 are pivoted upwardly thereby releasing platform 45 for horizontal movement into horizontally disposed rails 90 and 91. Simultaneously with the unlatching of platform 45, fingers 84 which are integrally connected to plate 82 are inserted into slots 88 and 89 thereby adapting platform 45 to be pulled inwardly into rails 90 and 91. With the hydraulic locking cylinders 115 and 116 having been energized, terminals 149 and 150 of switch 148 are disconnected thereby breaking the down circuit and terminals 170 and 171 of switch 148 are connected thereby completing the in circuit since terminals 172 and 173 are closed in this position. To draw platform 45 inwardly, switch 165 or 165' is closed thereby energizing solenoid 166 which opens solenoid valve 110. The platform 45 is thereby pulled by chains 71 and 72 along horizontally disposed rails 90 and 91. Platform 45 may be stopped at any desired position along its travel. The in circuit remains open until platform 45 reaches its innermost position whereupon terminals 172 and 173 are disconnected thereby opening the in circuit. Upon disconnecting terminals 172 and 173, terminals 160 and 161 are closed thereby closing the unlocking circuit. If the operator desires to lower platform receiving rails 38 and 39 as well as inwardly positioned rails 36 and 37 while platform 45 is at its innermost position, switch 156 may be closed thereby completing the unlocking circuit and piston rods 120 and 121 of hydraulic locking cylinders 115 and 116 are withdrawn from channel rails 36 and 37. By withdrawing piston rods 120 and 121 into cylinders 115 and 116, terminals 149 and 150 of switch 148 are connected thereby closing the circuit for lowering the platform receiving rails 38 and 39. It is noted that by closing terminals 149 and 150, terminals 170 and 171 of switch 148 are opened thereby opening the out circuit. To move platform 45 outwardly and toward platform receiving rails 38 and 39, the inwardly positioned channel rails 36 and 37 must again be locked by locking cylinders 115 and 116 whereupon terminals 174 and 175 of switch 159 are reconnected thereby closing the out circuit. With the out circuit closed, switch 178 is closed thereby completing the out circuit and energizing solenoid 179 of solenoid valve 110. With the solenoid valve 110 open, the hydraulic motor 73 pulls platform 45 outwardly into channel rails 38 and 39, terminals 149 and 150 of switch 148 are reconnected thereby closing the down circuit. Upon closing switch 146, solenoid 147 is energized thereby opening solenoid valve 122 which causes piston rods 52 and 53 to move outwardly from hydraulic cylinders 50 and 51 thereby rolling platform 45 to any position along vertical track 30.

Many embodiments of this invention may be made without departing from the scope and spirit thereof. Therefore, it is to be made understood that the invention is not to be limited to the specific embodiment shown and described herein, except as defined in the appended claims.

What is claimed is:
1. In combination with a ground engaging vehicle having a cab and a receptacle body behind said cab, an apparatus for handling containers comprising:
 (a) a vertically disposed first track system mounted on said body with its upper end adjacent the top of said body and its lower end adapted to be extended downwardly from said body into a position adjacent said ground;
 (b) a horizontally disposed second track mounted on and adjacent the top of said body and having a terminal end thereof positioned substantially adjacent said upper end of said first vertical track system;
 (c) a third track slidably mounted on said first track system and adapted to ride along the length of said first track system, said third track forming an extension of said second track when said third track is positioned opposite to and in alignment with said second track;
 (d) a platform means adapted to ride on said third track and be raised and lowered thereby, said platform means adapted to ride from said third track to said second track when said third track is positioned opposite to and in alignment with said second track thereby forming an extension thereof; and
 (e) power means mounted on said vehicle for raising and lowering said third track along said first track system and for moving said platform means along said second and third tracks.

2. In combination with a ground engaging vehicle having a cab and a receptacle body behind said cab, said receptacle body including a floor, a vertically positioned front wall mounted on said floor behind said cab and a pair of oppositely disposed, vertically positioned parallel side walls secured to said floor and to said front wall and extending rearwardly from said front wall, an apparatus for handling containers comprising:
 (a) a vertically disposed first track system including a first pair of vertical track rails, each of said first pair of vertical track rails comprising an outwardly positioned, inwardly facing channel rail rigidly mounted on the rearward portions of a selected side wall, a second pair of pinion rails slidably mounted on said vertical track rails and a third pair of inwardly positioned, outwardly facing channel rails slidably mounted on said pinion rails;
(b) a horizontally disposed second track including a fourth pair of inwardly facing channel rails securely mounted on a selected side wall and having terminal ends thereof adjacent the upper end of said first pair of rails;
(c) a third track including a fifth pair of spaced inwardly facing channel rails respectively mounted on said third pair of rails of said first track system, said third track adapted to form an extension of said second track when said fifth pair of rails of said third track are in a position opposite to and in alignment with said fourth pair of rails of said second track;
(d) platform means adapted to be carried by said rails of said third track and adapted to ride horizontally on said rails of said third track and said rails of said second track when said rails of said third track form an extension of said rails of said second track by being positioned opposite to and in alignment therewith; and
(e) means mounted on said vehicle for moving said third track vertically along said first track system and for moving said platform means horizontally along said third track and said second track when said third track forms an extension of said second track.

3. The apparatus for handling containers of claim 2 wherein said fifth pair of rails of said third track are pivotally mounted on said third pair of rails.

4. The apparatus for handling containers of claim 3 wherein said platform means comprises a top surface, a plurality of sides integrally extending downwardly from each edge of said top surface, a plurality of rollers mounted on and extending outwardly from selected ones of said sides and adapted to be rollably mounted in said fifth pair of rails of said third track and said fourth pair of rails of said second track, and a tail gate section pivotally mounted on a selected one of said sides and normally positioned parallel to and beneath said top surface whereby said top plate and said tail gate section are adapted to form a tail gate for said vehicle when said platform means resides in said rails of said third track and when said rails of said third track are pivoted upwardly into a vertical plane and said tail gate section is pivoted downwardly away from said top plate into a vertical plane.

5. In combination with a ground engaging vehicle having a cab and a receptacle body behind said cab, said receptacle body including a floor, a vertically positioned front wall mounted on said floor behind said cab and a pair of oppositely disposed, vertically positioned parallel side walls secured to said floor and to said front wall and extending rearwardly from said front wall, an apparatus for handling containers comprising:
(a) a vertically disposed first track system including a first pair of vertical track rails, each of said vertical track rails comprising an outwardly positioned, inwardly facing channel rail rigidly mounted on the rearward portions of a selected side wall, a second pair of pinion rails slidably mounted on said vertical track rails and a third pair of inwardly positioned, outwardly facing channel rails slidably mounted on said pinion rails;
(b) a horizontally disposed second track including a fourth pair of inwardly facing channel rails securely mounted on a selected side wall and having terminal ends thereof adjacent the upper end of said first track system;
(c) a third track including a fifth pair of spaced inwardly facing channel rails respectively mounted on said third pair of rails of said first track system, said third track adapted to form an extension of said second track when said fifth pair of rails of said third track are in a position opposite to and in alignment with said fourth pair of rails of said second track;
(d) a platform means adapted to be carried by said fifth pair of rails of said third track and adapted to ride horizontally on said fifth pair of rails of said third track and said fourth pair of rails of said second track when said rails of said third track form an extension of said rails of said second track by being positioned opposite to and in alignment therewith;
(e) a pair of hydraulic cylinders mounted respectively on said oppositely disposed side walls and being connected to said third pair of rails of said first track system by a flexible means whereby upon the energization of said hydraulic cylinders said platform means is selectively raised and lowered; and
(f) a hydraulic motor mounted on said vehicle and connected to said platform means by a flexible means when said fifth pair of rails of said third track form an extension of said fourth pair of rails of said second track and adapted to move said platform means horizontally along said third track and said second track when said third track forms an extension of said second track.

6. The apparatus for handling containers of claim 5 wherein said fifth pair of rails of said third track are pivotally mounted on said third pair of rails of said first track.

7. The apparatus for handling containers of claim 6 wherein said platform means comprises a top surface, a plurality of sides integrally extending downwardly from each edge of said top surface, a plurality of rollers mounted on and extending outwardly from selected ones of said sides and adapted to be rollably mounted in said fifth pair of rails of said third track and said fourth pair of rails of said second track, and a tail gate section pivotally mounted on a selected one of said sides and normally positioned parallel to and beneath said top surface whereby said top plate and said tail gate section are adapted to form a tail gate for said vehicle when said platform means resides in said rails of said third track and when said rails of said third track are pivoted upwardly into a vertical plane and said tail gate section is pivoted downwardly away from said top plate into a vertical plane.

8. In combination with a ground engaging vehicle having a cab and a receptacle body behind said cab, said receptacle body including a floor, a vertically positioned front wall mounted on said floor behind said cab and a pair of oppositely disposed, vertically positioned parallel side walls secured to said floor and to said front wall and extending rearwardly from said front wall, an apparatus for handling containers comprising:
(a) a vertically disposed first track system including stationary vertical members secured to each of said side walls and extending the vertical length of said side walls and slidable members adapted to travel along said stationary members from a position of extending above said side walls to a position beneath said side walls and adjacent said ground;
(b) a horizontally disposed second track having a pair of parallel rails with one of said rails mounted on each of said parallel side walls, said second track rails having a terminal end thereof adjacent a selected slidable member of said first track system;
(c) a third track including a pair of spaced, parallel rails each mounted on a respective slidable member of said first track system, said third track rails adapted to form an extension of said second track rails when said third track rails are positioned opposite to and in alignment with said second track rails;
(d) a platform means adapted to be carried by said third track rails and adapted to ride horizontally on said third track rails and said second track rails when said third track rails form an extension of said second track rails by being positioned opposite to and in alignment therewith; and (e) power means mounted on said vehicle and connected to said slidable members of said first track by a first flexible means to move said platform means vertically along said first track system, said power means also connected to said platform means by a second flexible means when said third track rails form an extension of said second track rails to move said platform means horizontally along said third track and said second track when said third track rails form an extension of said second track rails.

9. The apparatus for handling containers of claim 8 wherein said apparatus is provided with a means mounted on said side walls for selectively locking said slidable members of said first track system relative said side walls when said third track rails are positioned to form an extension of said second track rails.

10. The apparatus for handling containers of claim 9 wherein said power means and said locking means are remotely energized by a plurality of like control stations, at least one of said control stations being adapted for movement by being mounted on said platform means and at least one other of said control stations being rigidly mounted on said vehicle, said movable control station being connected to said power means and said locking means by a flexible and extensible cable.

11. The apparatus for handling containers of claim 10 wherein said control stations are adapted to energize said locking means thereby locking said slidable members of said first track system relative said side walls only when said third track rails form an extension of said second track rails.

12. The apparatus for handling containers of claim 11 wherein said control stations are adapted to energize said power means for moving said platform means horizontally only after said locking means has been energized and is locking said slidable members relative said side walls.

13. The apparatus for handling containers of claim 8 wherein said third track rails are pivotally mounted on said respective slidable members.

14. The apparatus for handling containers of claim 13 wherein said platform means comprises a top surface, a plurality of side surfaces extending downwardly from each edge of said top surface, a plurality of riders mounted on and extending outwardly from selected ones of said side surfaces and adapted to ridably engage said third track rails and said second track rails, and a tail gate surface pivotally mounted on a selected one of said side surfaces and normally positioned parallel to and beneath said top surface whereby said top surface and said tail gate surface are adapted to form a tail gate for said vehicle when said platform means resides on said third track rails and when said third track rails are pivoted upwardly into a vertical plane and said tail gate surface is pivoted downwardly away from said top surface into a vertical plane.

15. In combination with a ground engaging vehicle having a cab and a receptacle body behind said cab, said receptacle body including a floor, a vertically positioned front wall mounted on said floor behind said cab and a pair of oppositely disposed, vertically positioned parallel side walls secured to said floor and to said front wall and extending rearwardly from said front wall, an apparatus for handling containers comprising:
(a) a vertically disposed first track system including a first pair of vertical track channel rails being outwardly positioned and inwardly facing, said first pair of channel rails being rigidly mounted respectively on the rearward portions of said side walls, a second pair of vertical track pinion rails having opposed flat surfaces being provided for said first pair of channel rails, said second vertical track pinion rails mounted between said first track channel rails and having rollers connected to and extending from each of said opposed sides thereof, said rollers of one selected side of second pinion track rails being rollably received in said channel rails, and a third pair of inwardly positioned, outwardly facing channel first track rails each receiving and being rollably mounted on a respective pinion rail;
(b) a horizontally disposed second track including a fourth pair of parallel inwardly facing channel rails with one of said rails mounted on a selected parallel side wall, said second track having terminal ends adjacent a selected and corresponding rail of said first track;
(c) a third track including a first pair of spaced, inwardly facing channel rails respectively and pivotally mounted on said third track adapted to form an extension of said second track when said third pair of rails of said third track are in a position opposite to and in alignment with said fourth pair of rails of said second track;
(d) a platform comprising a top surface, a plurality of side surfaces extending downwardly from each edge of said top surface, a plurality of rollers mounted on and extending outwardly from selected ones of said side surfaces and adapted to be rollably mounted in said fifth pair of rails of said third track and said fourth pair of rails of said second track, and a tail gate surface pivotally mounted on a selected one of said side surfaces and normally positioned parallel to and beneath said top surface whereby said top surface and said tail gate surface are adapted to form a tail gate for said vehicle when said third track rails are pivoted upwardly into a vertical plane and said tail gate surface is pivoted downwardly away from said top surface into a vertical plane;
(e) a pair of hydraulic cylinders mounted respectively on said oppositely disposed side walls and being connected to said third pair of channel rails of said first track system by a flexible means whereby upon the energization of said hydraulic cylinder said platform means is selectively raised and lowered;
(f) a hydraulic motor mounted on said vehicle and connected to said platform by a flexible means when said fifth pair of rails of said third track form an extension of said fourth pair of rails of said second track and adapted to move said platform means horizontally along said third track and said second track when said third track forms an extension of said second track;
(g) a locking hydraulic cylinder mounted on each of said side walls and including piston rods, said piston rods when said locking hydraulic cylinders have been energized are adapted to engage said third pair of channel rails of said first track system and lock the same relative said side walls when said fifth pair of rails of said third track form an extension of said fourth pair of rails of said second track;
(h) energizing means mounted on said vehicle for seelectively energizing said hydraulic cylinders, said hydraulic motor and said locking hydraulic cylinders; and
(i) a plurality of like control stations with at least one of said control stations being adapted for movement by being mounted on said platform and being connected to said energizing means by a flexible and extensible cable and at least one other control station rigidly mounted on said vehicle and being connected to said energizing means by a cable.

16. The apparatus for handling containers of claim 15 wherein said control stations are adapted to actuate said energizing means whereby said platform is raised vertically by said hydraulic cylinders until said fifth pair of rails of said third track means form an extension of said fourth pair of rails of said second track whereupon said locking hydraulic cylinders are adapted to be made operable by said energizing means when actuated by said control stations.

17. The apparatus for handling containers of claim 16 wherein said control stations are adapted to actuate said energizing means whereby said platform is moved horizontally by said hydraulic motor along said third and said second tracks when said piston rods of said locking hydraulic cylinders have been energized and engage said third pair of rails of said first track system so as to lock the same relative said side walls.

18. In combination with a ground-engaging vehicle having a cab and a receptacle body behind said cab, an apparatus for handling containers comprising:
(a) a vertically disposed first track mounted on said body and having upper and lower ends;
(b) a horizontally disposed second track mounted on and adjacent the top of said body and having a terminal end thereof positioned substantially adjacent said upper end of said first track;
(c) support means adapted to ride both said first and second tracks and to support containers while riding thereon;
(d) connecting means mounted to carry said support means on said first track and effective to provide a connecting track between said respective upper and terminal ends of said first and second tracks when said support means is positioned opposite to and in riding alignment with said second track, said support means being adapted to ride said connecting track from said first track to said second track;
(e) power means mounted on said vehicle and connected to said support means for raising and lowering said support means along said first track and for selectively moving said support means along said connecting means and said second track when said connecting means has connected said first and second tracks; and
(f) a plurality of control stations at least one of which being mounted on said support means and another of which being mounted on said vehicle, said control stations being connected to and remotely controlling said power means.

References Cited

UNITED STATES PATENTS

| | | | |
|---|---|---|---|
| 2,442,549 | 6/1948 | Pearlman | 214—75 X |
| 2,521,727 | 9/1950 | Kappen | 214—518 |
| 2,635,771 | 4/1953 | Black | 214—75 |
| 3,240,369 | 3/1966 | Kappen | 214—75 |

ROBERT G. SHERIDAN, *Primary Examiner.*

UNITED STATES PATENT OFFICE
CERTIFICATE OF CORRECTION

Patent No. 3,363,790                                          January 16, 1968

Eugene R. Nelson

It is hereby certified that error appears in the above numbered patent requiring correction and that the said Letters Patent should read as corrected below.

Column 3, line 70, for "wtih" read -- with --; column 5, line 5, for "looking" read -- locking --; line 72, for "Posts" read -- Posts 19 --; column 7, line 37, for "valpe" read -- valve --; line 38, for "palve" read -- valve --; line 49, for "previounly" read -- previously --; column 8, line 17, strike out "the"; column 14, line 9, for "first" read -- fifth --; line 11, after "third" insert -- pair of channel rails, said third --.

Signed and sealed this 8th day of April 1969.

(SEAL)
Attest:

Edward M. Fletcher, Jr.                                    EDWARD J. BRENNER
Attesting Officer                                                  Commissioner of Patents